(12) United States Patent
Yan et al.

(10) Patent No.: US 8,197,279 B1
(45) Date of Patent: Jun. 12, 2012

(54) ELECTRONIC APPARATUS

(75) Inventors: Wen-Tse Yan, New Taipei (TW);
Chao-Jung Chen, New Taipei (TW)

(73) Assignee: AverMedia Tehnologies, Inc., New Taipei (TW)

( * ) Notice: Subject to any disclaimer, the term of this patent is extended or adjusted under 35 U.S.C. 154(b) by 0 days.

(21) Appl. No.: 13/095,890

(22) Filed: Apr. 28, 2011

(51) Int. Cl.
*H01R 13/62* (2006.01)

(52) U.S. Cl. .......................................... 439/371; 439/373

(58) Field of Classification Search .................. 439/371, 439/373
See application file for complete search history.

(56) References Cited

U.S. PATENT DOCUMENTS

| | | | |
|---|---|---|---|
| 6,769,930 B1 * | 8/2004 | McDevitt, Jr. | 439/373 |
| 7,722,380 B1 * | 5/2010 | West et al. | 439/373 |
| 7,850,478 B2 * | 12/2010 | Lin et al. | 439/373 |

* cited by examiner

*Primary Examiner* — Tho D Ta
(74) *Attorney, Agent, or Firm* — CKC & Partners Co., Ltd.

(57) ABSTRACT

An electronic apparatus includes a housing and a retaining member. The housing includes a connecting hole and an engagement hole. A connector is detachably connected to the connecting hole. The engagement hole includes a passing zone and an engagement zone that are communicated to each other. The retaining member includes a fixing end, an engagement end, and a retaining portion. The fixing end is fixed to the housing. The engagement end is capable of passing into the housing through the passing zone and is adapted to be engaged with the engagement zone. The retaining portion is connected between the fixing end and the engagement end for trapping the connector.

12 Claims, 9 Drawing Sheets

ELECTRONIC APPARATUS

BACKGROUND

1. Field of Invention

The present invention relates to an electronic apparatus, and more particularly, to an electronic apparatus that is able to prevent the connector from falling off.

2. Description of Related Art

Most of current electronic apparatuses use external lines. In terms of universality, most of home appliances and consumer electronic products (e.g. cell phone, PDA, and etc.) will get power by using external power connectors. In terms of diversity of adopted species, most of computer hosts, such as personal computers, notebook computers, industrial computers, and other computers, will adopt various kinds of input/output connectors (e.g. USB, D-Sub; DVI, RJ-45, HDMI, AV terminal, S terminal) in response to various requirements.

However, the present mechanisms and designs for preventing an external connector from falling off from an electronic apparatus are limited to a small part of the connectors (e.g. RJ-45, D-Sub, DVI, and etc.). And, the connectors with anti-off designs always have shortcomings of larger volume and higher costs. Most of other connectors that are consistent with international norms do not have anti-off design and just neatly fix the wires of the connectors to each other. But, the effect of simply fixing the wires of the connectors to prevent the connectors from falling off from an electronic apparatus is not good.

SUMMARY

In order to solve the problems of prior arts, an electronic apparatus according to an embodiment of the invention is provided. By adding a retaining member for trapping the external connector on the electronic apparatus, the external connector can be prevented from falling off from the electronic apparatus to influent the functions of the electronic apparatus.

According to an embodiment of the invention, an electronic apparatus is adapted for a connector. The electronic apparatus includes a housing and a retaining member. The housing includes a connecting hole and an engagement hole. The connector is detachably connected to the connecting hole. The engagement hole includes a passing zone and an engagement zone that are communicated to each other. The retaining member includes a fixing end, an engagement end, and a retaining portion. The fixing end is fixed to the housing. The engagement end is capable of passing into the housing through the passing zone and adapted to be engaged with the engagement zone. The retaining portion is connected between the fixing end and the engagement end for trapping the connector.

According to another embodiment of the invention, an electronic apparatus is adapted for a connector. The electronic apparatus includes a housing and a retaining member. The housing includes a connecting hole and an engagement hole. The connector is detachably connected to the connecting hole. The engagement hole includes a passing zone and an engagement zone that are communicated to each other. The retaining member includes a first engagement end, a second engagement end, and a retaining portion. The second engagement end is detachably engaged with the first engagement end. The first engagement end and the second engagement end that are engaged to each other are capable of passing into the housing through the passing zone and adapted to be engaged with the engagement zone. The retaining portion is connected between the first engagement end and the second engagement end for trapping the connector.

According to another embodiment of the invention, an electronic apparatus is adapted for a connector. The electronic apparatus includes a housing and a retaining member. The housing includes a connecting hole, a first engagement hole, and a second engagement hole. The connector is detachably connected to the connecting hole. The first engagement hole includes a first passing zone and a first engagement zone that are communicated to each other. The second engagement hole includes a second passing zone and a second engagement zone that are communicated to each other. The retaining member includes a first engagement end, a second engagement end, and a retaining portion. The first engagement end is capable of passing into the housing through the first passing zone and adapted to be engaged with the first engagement zone. The second engagement end is capable of passing into the housing through the second passing zone and adapted to be engaged with the second engagement zone. The retaining portion is connected between the first engagement end and the second engagement end for trapping the connector.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
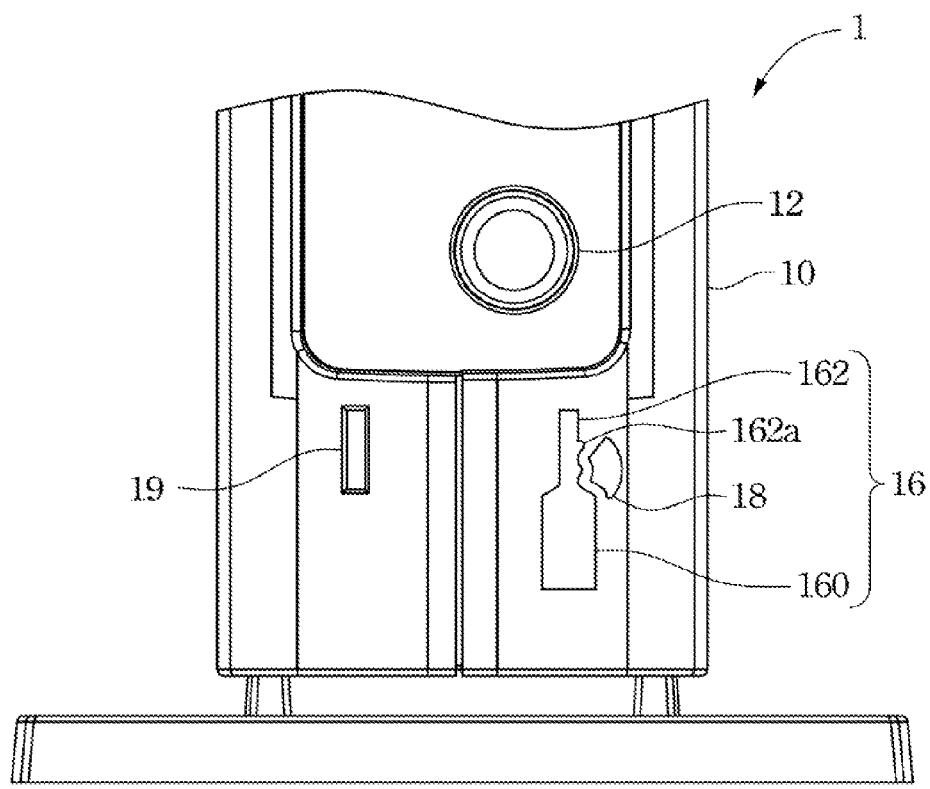
FIG. 1A is a front view showing the housing of the electronic apparatus according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

An electronic apparatus according to an embodiment of the invention is provided. Specifically, by adding a retaining member for trapping the external connector on the electronic apparatus, the external connector can be prevented from falling off from the electronic apparatus to influent the functions of the electronic apparatus.

Figure 1B:
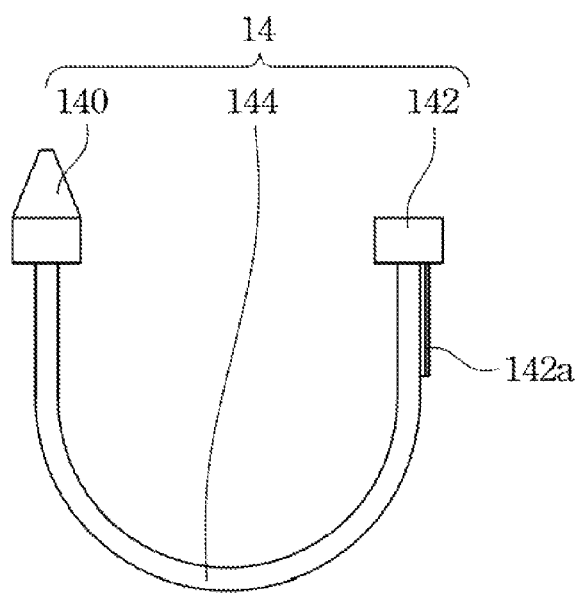
FIG. 1B is a top view showing the retaining member of the electronic apparatus according to an embodiment.

Please refer to FIG. 1A and FIG. 1B. FIG. 1A is a front view showing the housing 10 of the electronic apparatus 1 according to an embodiment of the invention. FIG. 1B is a top view showing the retaining member 14 of the electronic apparatus 1 according to an embodiment.

As shown in FIG. 1A and FIG. 1B, the electronic apparatus 1 of the invention can be applied in, but not limited to, computer hosts (e.g. personal computer, notebook computer, tablet computer, industrial computer, and etc.) or consumer electronic products (e.g. set top box, multimedia player, and etc.). In other words, the electronic apparatus applies 1 of the invention can be any electronic apparatus adopting external connectors. Electronic apparatuses that have the requirement of preventing the external connectors from falling off can apply the concepts of the electronic apparatus 1 disclosed by the invention to achieve the goal.

As shown in FIG. 1A and FIG. 1B, the electronic apparatus 1 of the embodiment mainly includes a housing 10 and a retaining member 14. The housing 10 of the electronic apparatus 1 includes a connecting hole 12 and an engagement hole 16. The engagement hole 16 of the housing 10 includes a passing zone 160 and an engagement zone 162 that are communicated to each other. Besides, the retaining member 14 of the electronic apparatus 1 includes a fixing end 140, an engagement end 142, and a retaining portion 144. The retaining portion 144 of the retaining member 14 is connected between the fixing end 140 and the engagement end 142.

Figure 2A:
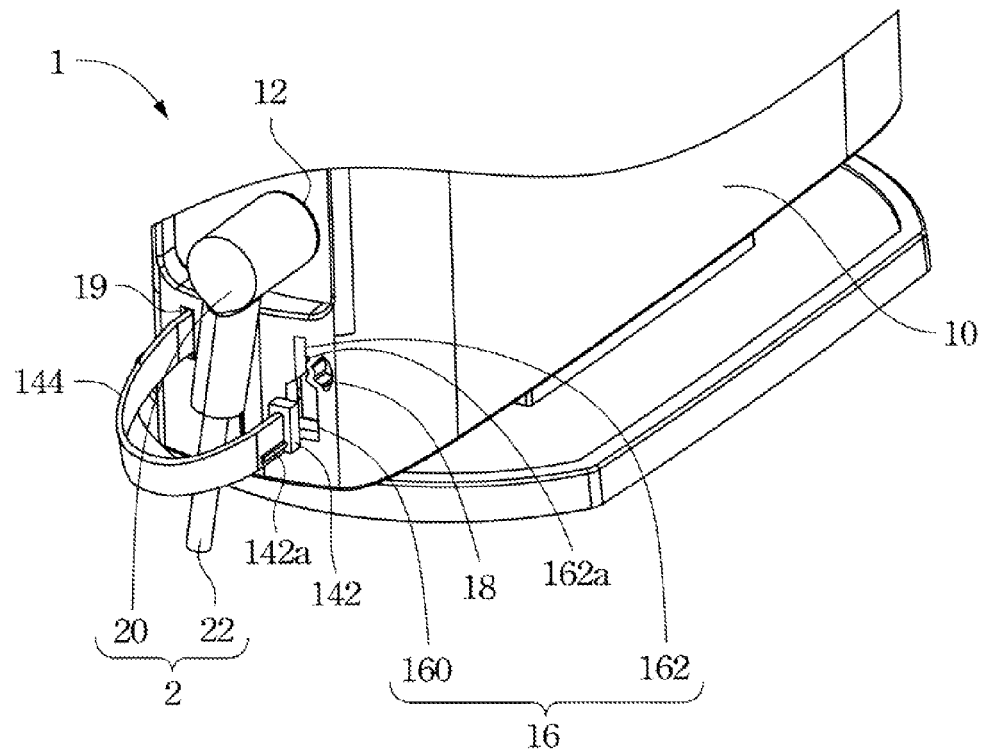
FIG. 2A is a stereoscopic view showing the electronic apparatus in FIG. 1A, wherein the fixing end of the retaining member is fixed in the fixing hole.
Figure 2B:
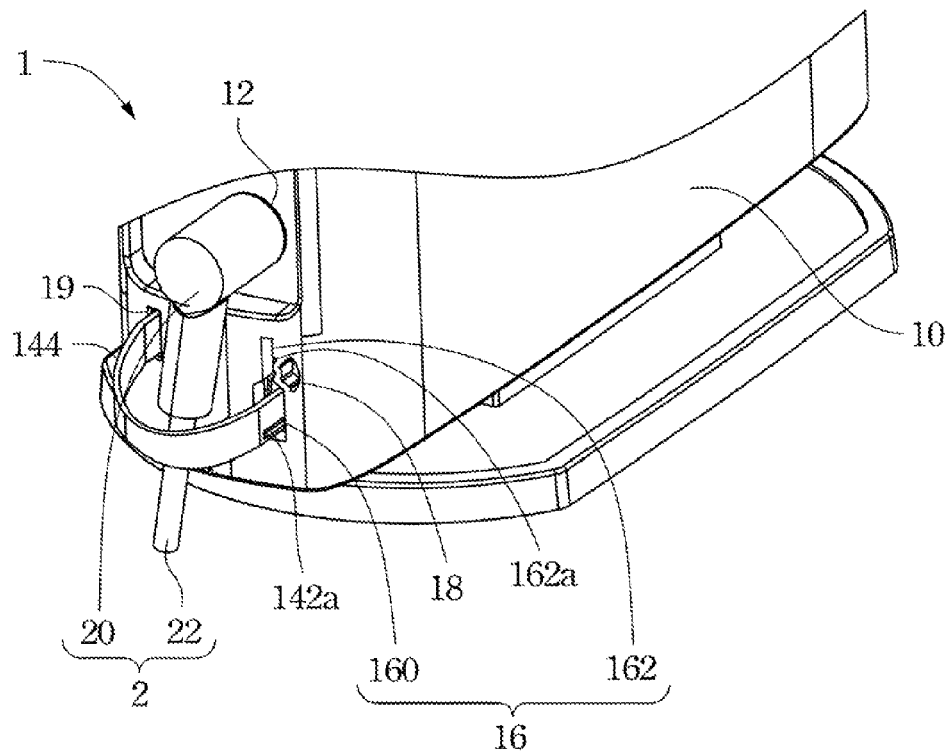
FIG. 2B is another stereoscopic view showing the electronic apparatus in FIG. 1A, wherein the engagement end of the retaining member has passed into the housing through the passing zone.
Figure 2C:
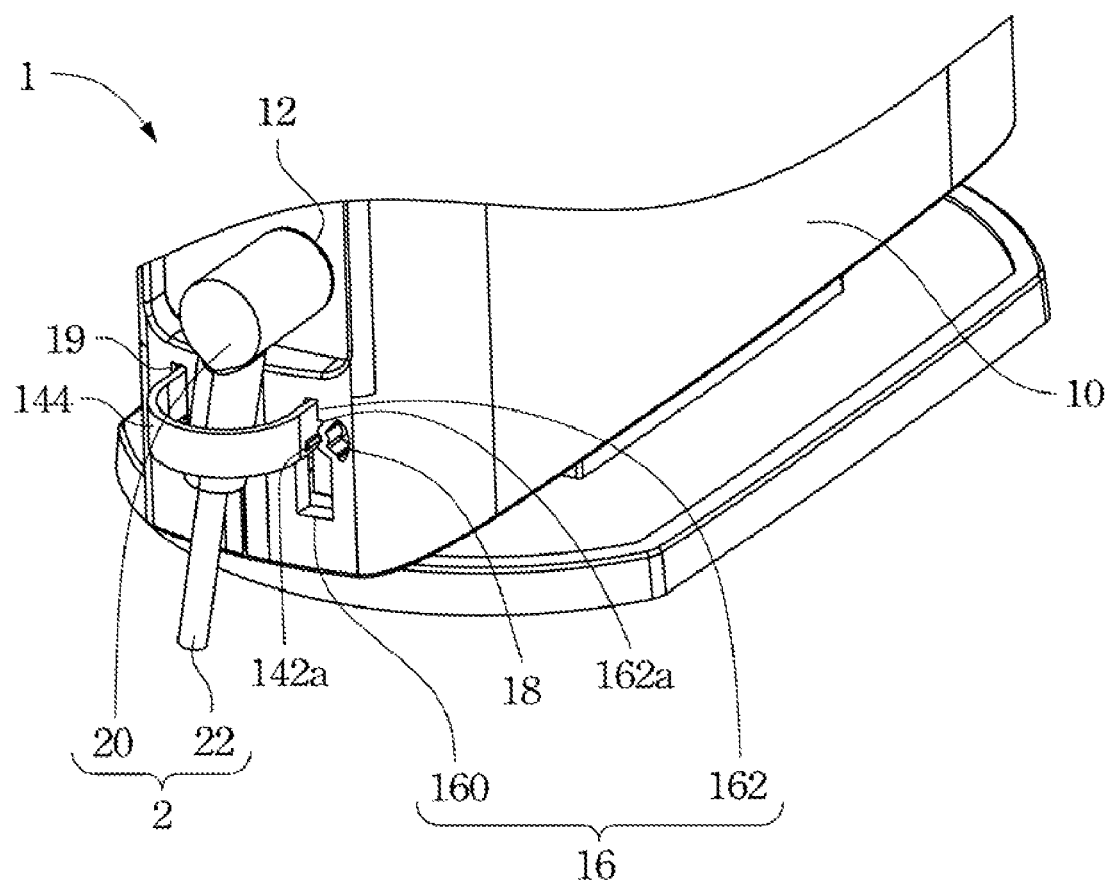
FIG. 2C is another stereoscopic view showing the electronic apparatus in FIG. 1A, wherein the engagement end of the retaining member has been engaged with the engagement zone.

Please refer to FIG. 2A, FIG. 2B, and FIG. 2C. FIG. 2A is a stereoscopic view showing the electronic apparatus 1 in FIG. 1A, wherein the fixing end 140 of the retaining member 14 is fixed in the fixing hole 19. FIG. 2B is another stereoscopic view showing the electronic apparatus 1 in FIG. 1A, wherein the engagement end 142 of the retaining member 14 has passed into the housing 10 through the passing zone 160. FIG. 2C is another stereoscopic view showing the electronic apparatus 1 in FIG. 1A, wherein the engagement end 142 of the retaining member 14 has been engaged with the engagement zone 162.

As shown in FIG. 2A, FIG. 2B, and FIG. 2C, the electronic apparatus 1 of the embodiment is mainly adapted for an external connector 2. Practically, the connector 2 can be detachably connected to the connecting hole 12 on the housing 10 of the electronic apparatus 1. Besides, the housing 10 can further include a fixing hole 19. The fixing end 140 of the retaining member 14 can be fixed in the fixing hole 19 of the housing 10. In an embodiment, the fixing end 140 of the retaining member 14 and the housing 10 of the electronic apparatus 1 can also be integrally formed. Under the circumstances that the connector 2 and the connecting hole 12 of the housing 10 are connected to each other, the engagement end 142 of the retaining member 14 is capable of passing into the housing 10 through the passing zone 160 of the engagement hole 16 and adapted to be engaged with the engagement zone 162 of the engagement hole 16 to be fixed to the housing 10. Accordingly, the retaining portion 144 that is connected between the fixing end 140 and the engagement end 142 of the retaining member 14 can trap the connector 2, so as to limit the movement of the connector 2 relative to the electronic apparatus 1 and increase the stability between the connector 2 and the electronic apparatus 1. Furthermore, the connector 2 is constrained between the housing 10 and the retaining portion 144 of the retaining member 14 after the retaining member 14 is completely assemble on the housing 10.

In the embodiment, the width of the engagement zone 162 of the engagement hole 16 is smaller than that of the passing zone 160. That is to say, the engagement hole 16 including the passing zone 160 and the engagement zone 162 that are communicated to each other can, but not limited to, be T-shaped.

As shown in FIG. 2A, FIG. 2B, and FIG. 2C, the engagement end 142 of the retaining member 14 can further include a bump 142a. The engagement zone 162 of the engagement hole 16 can further include at least one recess 162a. The recess 162a of the engagement zone 162 is adapted to be engaged with the bump 142a of the engagement end 142, so as to achieve the goal of fixing the engagement end 142 of the retaining member 14 to the housing 10. In an embodiment, the bump 142a of the engagement end 142 can be replaced by the recess 162a of the engagement zone 162. Correspondingly, the recess 162a of the engagement zone 162 can be replaced by the bump 142a of the engagement end 142 to achieve the goal of fixing the engagement end 142 of the retaining member 14 to the housing 10. In the embodiment, the engagement zone 162 includes, but not limited to, two recesses 162a (as shown in FIG. 1A). The quantity of the recesses 162a of the engagement zone 162 can be elastically adjusted according to the requirements during designing or the limitations during manufacturing.

Furthermore, in order to make retaining member 14 to be conveniently fixed to the housing 10, the bump 142a of the engagement end 142 can further extend to the retaining portion 144. By lengthening the bump 142a of the engagement end 142, the bump 142a of the engagement end 142 can be conveniently engaged with the recess 162a of the engagement zone 162. In the embodiment, the bump 142a of the engagement end 142 and the recess 162a of the engagement zone 162 can also be, but not limited to, strip-shaped. The shapes of the bump 142a of the engagement end 142 and the recess 162a of the engagement zone 162 can be elastically adjusted according to the requirements during designing or the limitations during manufacturing.

As shown in FIG. 2A, FIG. 2B, and FIG. 2C, the retaining member 14 of the electronic apparatus 1 can be made of materials having ductility. In the embodiment, the retaining member 14 can be made of bendable metal materials. Because metal materials are difficultly be deformed, the housing 10 of the embodiment can further include a through hole 18. The through hole 18 of the housing 10 is adjacent to the engagement zone 162 of the engagement hole 16, so as to allow the engagement zone 162 to deform when the engagement zone 162 is compressed. In other words, during the process that the engagement end 142 is pushed from the passing zone 160 of the engagement hole 16 toward the engagement zone 162, the bump 142a of the engagement end 142 will compress the engagement zone 162 to deform toward the through hole 18. When the bump 142a of the engagement end 142 moves to the recess 162a of the engagement zone 162, the engagement zone 162 will elastically recover to make the recess 162a and the bump 142a of the engagement end 142 to be engaged to each other.

In an embodiment, the retaining member 14 can also be made of polymeric materials (e.g. rubber) that are bendable and compressible. Accordingly, during the process that the engagement end 142 is pushed from the passing zone 160 of the engagement hole 16 toward the engagement zone 162, the bump 142a of the engagement end 142 will be compressed and deformed by the engagement zone 162. When the bump 142a of the engagement end 142 moves to the recess 162a of the engagement zone 162, the bump 142a of the engagement end 142 will elastically recover to be engaged to with the recess 162a. In other words, if the retaining member 14 is made of elastic materials capable of being compressed, the through hole 18 of the housing 10 can be omitted.

As shown in FIG. 2A, FIG. 2B, and FIG. 2C, the connector 2 includes a is terminal 20 and a cable 22. The terminal 20 of the connector 2 can be detachably connected to the connecting hole 12 of the housing 10. In the embodiment, the retaining portion 144 of the retaining member 14 mainly traps, but not limited to, the cable 22 of the connector 2. In other words, the retaining portion 144 of the retaining member 14 can also trap or hook the terminal 20 of the connector 2, so as to limit the movement of the connector 2 relative to the electronic apparatus 1 and increase the stability between the connector 2 and the electronic apparatus 1.

Besides, in order to prevent the terminal 20 of the connector 2 from easily separating from the connecting Nile 12 when the cable 22 of the connector 2 is pulled, the length of the retaining portion 144 of the retaining member 14 can be properly adjusted. For example, in order to achieve the effect of anti-off, the length of the retaining portion 144 can be, but not limited to, smaller than two times of the length of the terminal 20 of the connector 2. In other words, in order to achieve better effect of anti-off, the length of the retaining portion 144 can be much smaller than two times of the length of the terminal 20 of the connector 2.

Figure 3A:
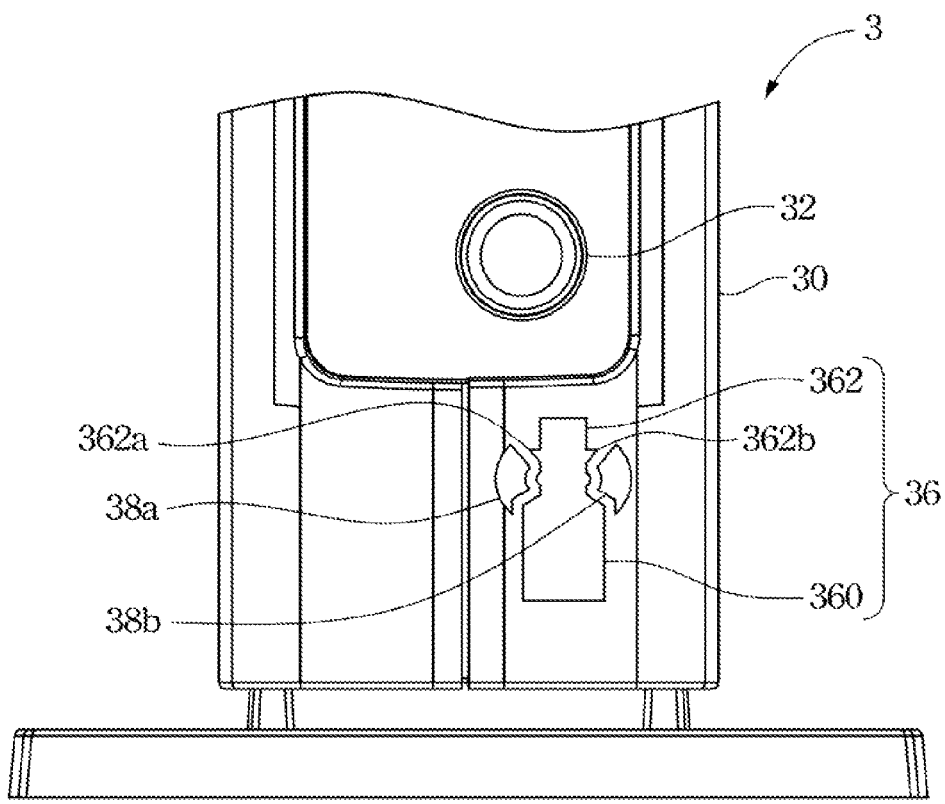
FIG. 3A is a front view showing the housing of the electronic apparatus according to another embodiment of the invention.
Figure 3B:
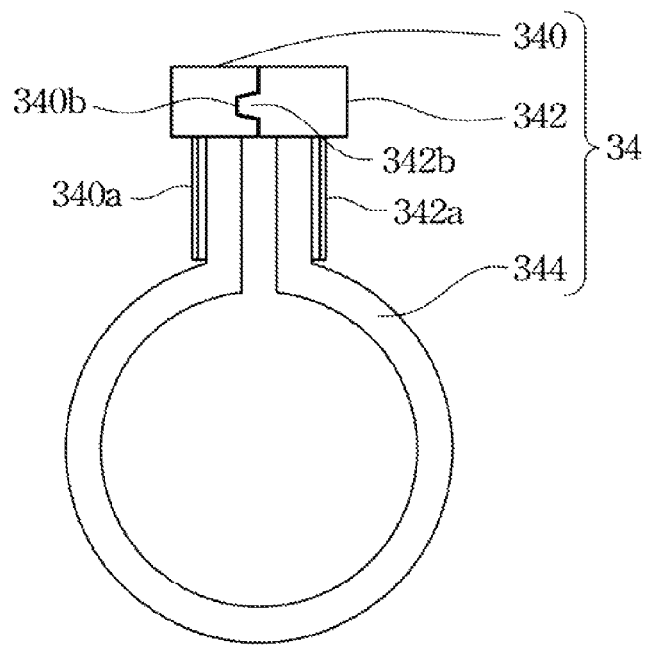
FIG. 3B is a top view showing the retaining member of the electronic apparatus according to another embodiment.

Please refer to FIG. 3A and FIG. 3B. FIG. 3A is a front view showing the housing 30 of the electronic apparatus 3 according to another embodiment of the invention. FIG. 3B is a top view showing the retaining member 34 of the electronic apparatus 3 according to another embodiment.

As shown in FIG. 3A and FIG. 3B, the electronic apparatus 3 of the embodiment mainly includes a housing 30 and a retaining member 34. The housing 30 of the electronic apparatus 3 includes a connecting hole 32 and an engagement hole 36. The engagement hole 36 of the housing 30 includes a passing zone 360 and an engagement zone 362 that are communicated to each other. Besides, the retaining member 34 of the electronic apparatus 3 includes a first engagement end 340, a second engagement end 342, and a retaining portion 344. The second engagement end 342 of the retaining member 34 is detachably engaged with the first engagement end 340. The retaining portion 344 of the retaining member 34 is connected between the first engagement end 340 and second engagement end 342. In the embodiment, the first engagement end 340 of the retaining member 34 can further include an engagement trough 340b, and the second engagement end 342 of the retaining member 34 can further include an engagement block 342b, wherein the shape of the engagement trough 340b of the first engagement end 340 and that of the engagement block 342b of the second engagement end 342 are adapted to be engaged to each other. In an embodiment, the engagement trough 340b of the first engagement end 340 can be replaced by the engagement block 342b of the second engagement end 342, and the engagement block 342b of the second engagement end 342 can be correspondingly replaced by the engagement trough 340b of the first engagement end 340.

Figure 4A:
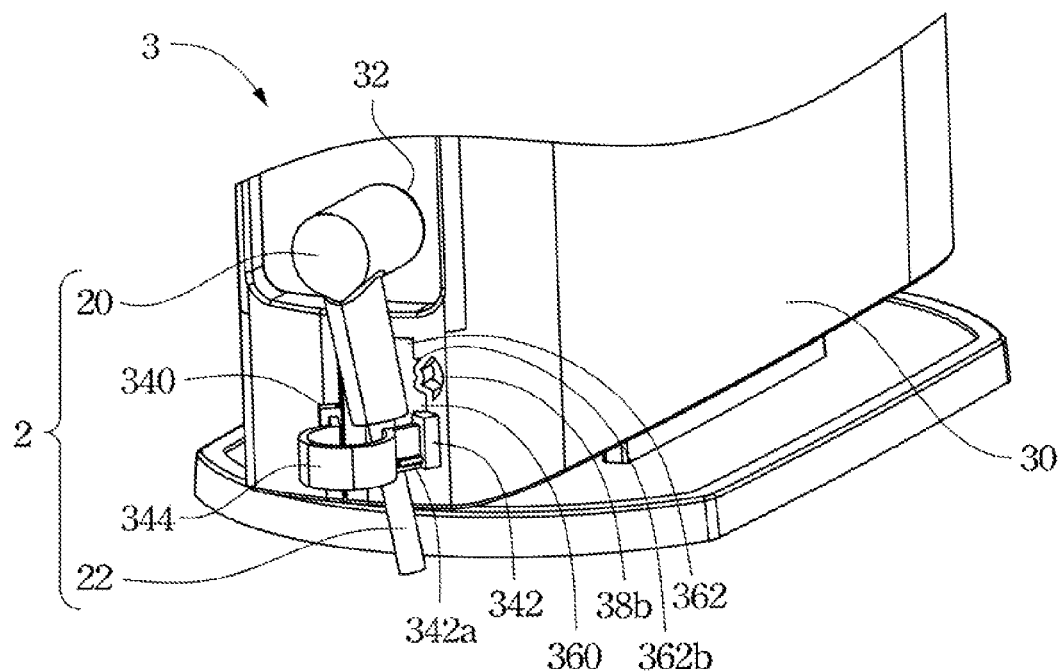
FIG. 4A is a stereoscopic view showing the electronic apparatus in FIG. 3A, wherein the first engagement end and the second engagement end of the retaining member have not been engaged to each other.
Figure 4B:
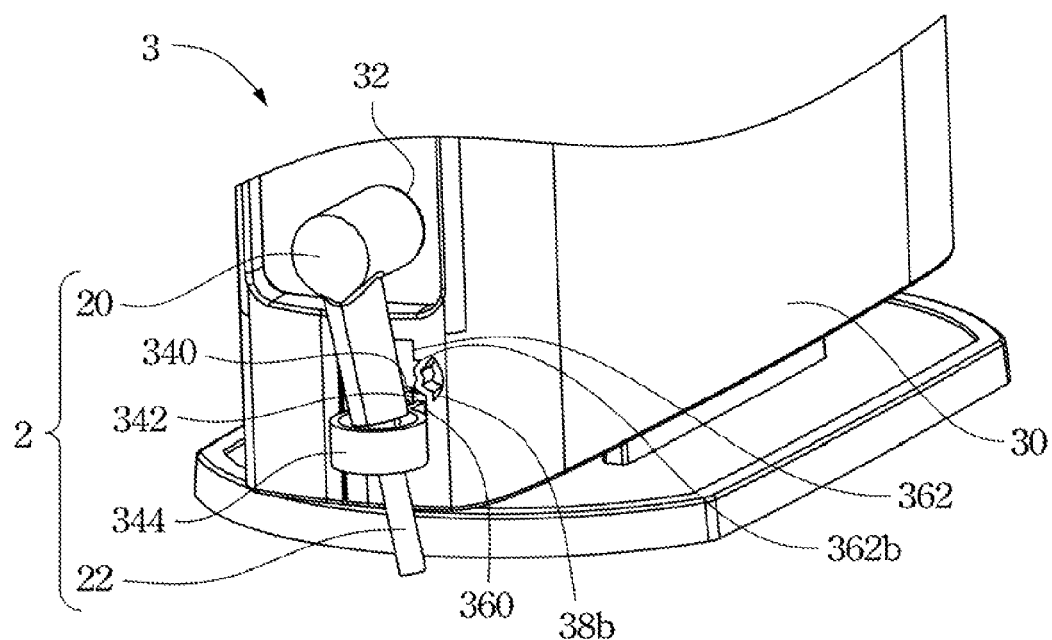
FIG. 4B is another stereoscopic view showing the electronic apparatus in FIG. 3A, wherein the first engagement end and the second engagement end that are engaged to each other have passed into the housing through the passing zone.
Figure 4C:
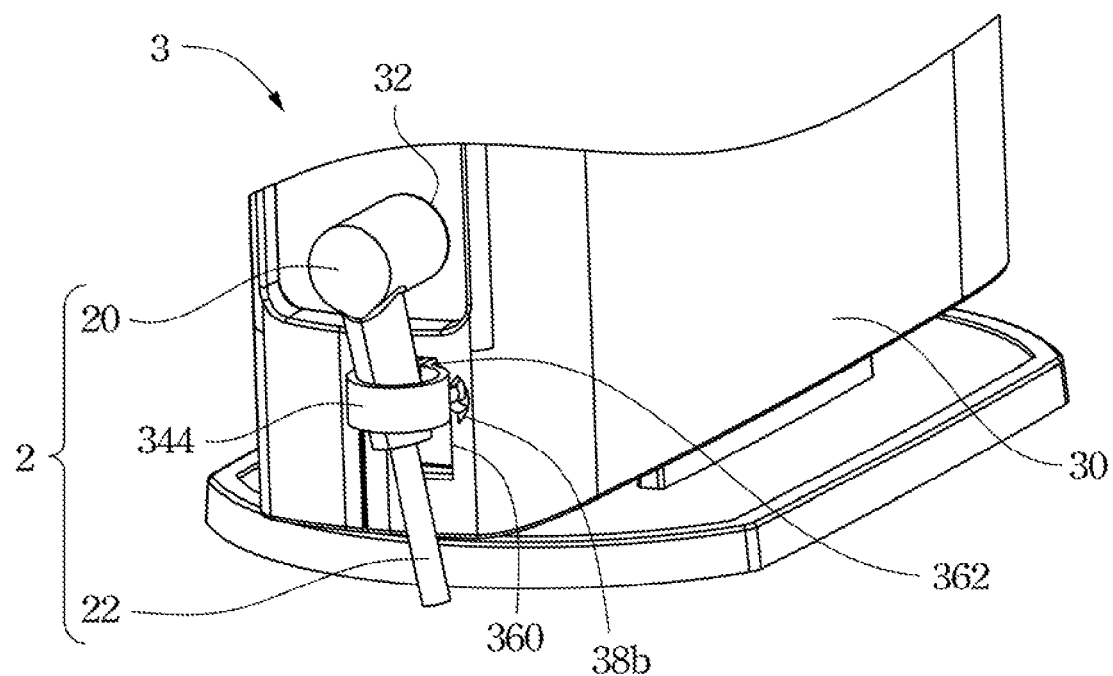
FIG. 4C is another stereoscopic view showing the electronic apparatus in FIG. 3A, wherein the first engagement end and the second engagement end that are engaged to each other have been engaged with the engagement zone.

Please refer to FIG. 4A, FIG. 4B, and FIG. 4C. FIG. 4A is a stereoscopic view showing the electronic apparatus 3 in FIG. 3A, wherein the first engagement end 340 and the second engagement end 342 of the retaining member 34 have not been engaged to each other. FIG. 4B is another stereoscopic view showing the electronic apparatus 3 in FIG. 3A, wherein the first engagement end 340 and the second engagement end 342 that are engaged to each other have passed into the housing 30 through the passing zone 360. FIG. 4C is another stereoscopic view showing the electronic apparatus 3 in FIG. 3A, wherein the first engagement end 340 and the second engagement end 342 that are engaged to each other have been engaged with the engagement zone 362.

As shown in FIG. 4A, FIG. 4B, and FIG. 4C, the connector 2 can be detachably connected to the connecting hole 32 on the housing 30 of the electronic apparatus 3. Under the circumstances that the connector 2 and the connecting hole 32 of the housing 30 are connected to each other, the first engagement end 340 and the second engagement end 342 that are engaged to each other are capable of passing into the housing 30 through the passing zone 360 of the engagement hole 36 and adapted to be engaged with the engagement zone 362 of the engagement hole 36 to be fixed to the housing 30. Accordingly, the retaining portion 344 that is connected between the first engagement end 340 and the second engagement end 342 of the retaining member 34 can trap the connector 2, so as to limit the movement of the connector 2 relative to the electronic apparatus 3 and increase the stability between the connector 2 and the electronic apparatus 3. Furthermore, the connector 2 is constrained among the first engagement end 340, the second engagement end 342, and the retaining portion 344 of the retaining member 34 after the retaining member 34 is completely assemble on the housing 30.

In the embodiment, the width of the engagement zone 362 of the engagement hole 36 is smaller than that of the passing zone 360. That is to say, the engagement hole 36 including the passing zone 360 and the engagement zone 362 that are communicated to each other can, but not limited to, be T-shaped.

As shown in FIG. 4A, FIG. 4B, and FIG. 4C, the first engagement end 340 of the retaining member 34 can further include a first bump 340a, and the second first engagement end 342 of the retaining member 34 can further include a second bump 342a. The engagement zone 362 of the engagement hole 36 can further include at least one first recess 362a and at least one second recess 362b. The first recess 362a of the engagement zone 362 is adapted to be engaged with the first bump 340a of the first engagement end 340, and the second recess 362b of the engagement zone 362 is adapted to be engaged with the second bump 342a of the second engagement end 342, so as to achieve the goal of fixing the first engagement end 340 and the second engagement end 342 that are engaged to each other of the retaining member 34 to the housing 30. In an embodiment, the first bump 340a of the first engagement end 340 can be replaced by the first recess 362a of the engagement zone 362, and the second bump 342a of the second engagement end 342 can be replaced by the second recess 362b of the engagement zone 362. Correspondingly, the first recess 362a of the engagement zone 362 can be replaced by the first bump 340a of the first engagement end 340, and the second recess 362b of the engagement zone 362 can be replaced by the second bump 342a of the second engagement end 342, so as to achieve the goal of fixing the first engagement end 340 and the second engagement end 342 that are engaged to each other of the retaining member 34 to the housing 30. In the embodiment, the engagement zone 362 includes, but not limited to, two first recesses 362a and two second recesses 362b (as shown in FIG. 3A). The quantities of the first recesses 362a and the second recesses 362b of the engagement zone 362 can be elastically adjusted according to the requirements during designing or the limitations during manufacturing.

Furthermore, in order to make retaining member 34 to be conveniently fixed to the housing 30, the first bump 340a of the first engagement end 340 can further extend to the retaining portion 344, and the second bump 342a of the second engagement end 342 can further extend to the retaining portion 344. By lengthening the first bump 340a of the first engagement end 340 and the second bump 342a of the second engagement end 342, the first bump 340a of the first engagement end 340 can be conveniently engaged with the first recess 362a of the engagement zone 362, and the second bump 342a of the second engagement end 342 can be conveniently engaged with the second recess 362b of the engagement zone 362. In the embodiment, the first bump 340a of the first engagement end 340, the second bump 342a of the second engagement end 342, and the first recess 362a and the second recess 362b of the engagement zone 362 can also be, but not limited to, strip-shaped. The shapes of the first bump 340a of the first engagement end 340, the second bump 342a of the second engagement end 342, and the first recess 362a and the second recess 362b of the engagement zone 362 can be elastically adjusted according to the requirements during designing or the limitations during manufacturing.

As shown in FIG. 4A, FIG. 4B, and FIG. 4C, the retaining member 34 of the electronic apparatus 3 can be made of materials having ductility. In the embodiment, the retaining member 34 can be made of bendable metal materials. Because metal materials are difficultly be deformed, the housing 30 of the embodiment can further include a first through hole 38a and a second through hole 38b. The first through hole 38a and the second through hole 38b of the housing 30 are respectively adjacent to two sides of the engagement zone 362 of the engagement hole 36, so as to allow the engagement zone 362 to deform when the engagement zone 362 is compressed. In other words, during the process that the first engagement end 340 and the second engagement end 342 that are engaged to each other are pushed from the passing zone 360 of the engagement hole 36 toward the engagement zone 362, the first bump 340a of the first engagement end 340 and the second bump 342a of the second engagement end 342 will compress the engagement zone 362 to deform toward the first through hole 38a and the second through hole 38b. When the first bump 340a of the first engagement end 340 and the second bump 342a of the second engagement end 342 respectively move to the first recess 362a and the second recess 362b of the engagement zone 362, the engagement zone 362 will elastically recover to make the first recess 362a and the first bump 340a of the first engagement end 340 to be engaged to each other and make the second recess 362b and the second bump 342a of the second engagement end 342 to be engaged to each other.

In an embodiment, the retaining member 34 can also be made of polymeric materials (e.g. rubber) that are bendable and compressible. Accordingly, during the process that the first engagement end 340 and the second engagement end 342 that are engaged to each other are pushed from the passing zone 360 of the engagement hole 36 toward the engagement zone 362, the first bump 340a of the first engagement end 340 and the second bump 342a of the second engagement end 342 will be compressed and deformed by the engagement zone 362. When the first bump 340a of the first engagement end 340 and the second bump 342a of the second engagement end 342 respectively move to the first recess 362a and the second recess 362b of the engagement zone 362, the first bump 340a of the first engagement end 340 and the second bump 342a of the second engagement end 342 will elastically recover to be respectively engaged to with the first recess 362a and the second recess 362b. In other words, if the retaining member 34 is made of elastic materials capable of being compressed, the first through hole 38a and the second through hole 38b of the housing 30 can be omitted.

As shown in FIG. 4A, FIG. 4B, and FIG. 4C, the connector 2 includes a terminal 20 and a cable 22. The terminal 20 of the connector 2 can be detachably connected to the connecting hole 32 of the housing 30. In the embodiment, the retaining portion 344 of the retaining member 34 mainly traps, but not limited to, the cable 22 of the connector 2. In other words, the retaining portion 344 of the retaining member 34 can also trap or hook the terminal 20 of the connector 2, so as to limit the movement of the connector 2 relative to the electronic apparatus 3 and increase the stability between the connector 2 and the electronic apparatus 3.

Besides, in order to prevent the terminal 20 of the connector 2 from easily separating from the connecting hole 32 when the cable 22 of the connector 2 is pulled, the length of the retaining portion 344 of the retaining member 34 can be properly adjusted. For example, in order to achieve the effect of anti-off, the length of the retaining portion 344 can be, but not limited to, smaller than two times of the length of the terminal 20 of the connector 2. In other words, in order to achieve better effect of anti-off, the length of the retaining portion 344 can be much smaller than two times of the length of the terminal 20 of the connector 2.

Figure 5A:
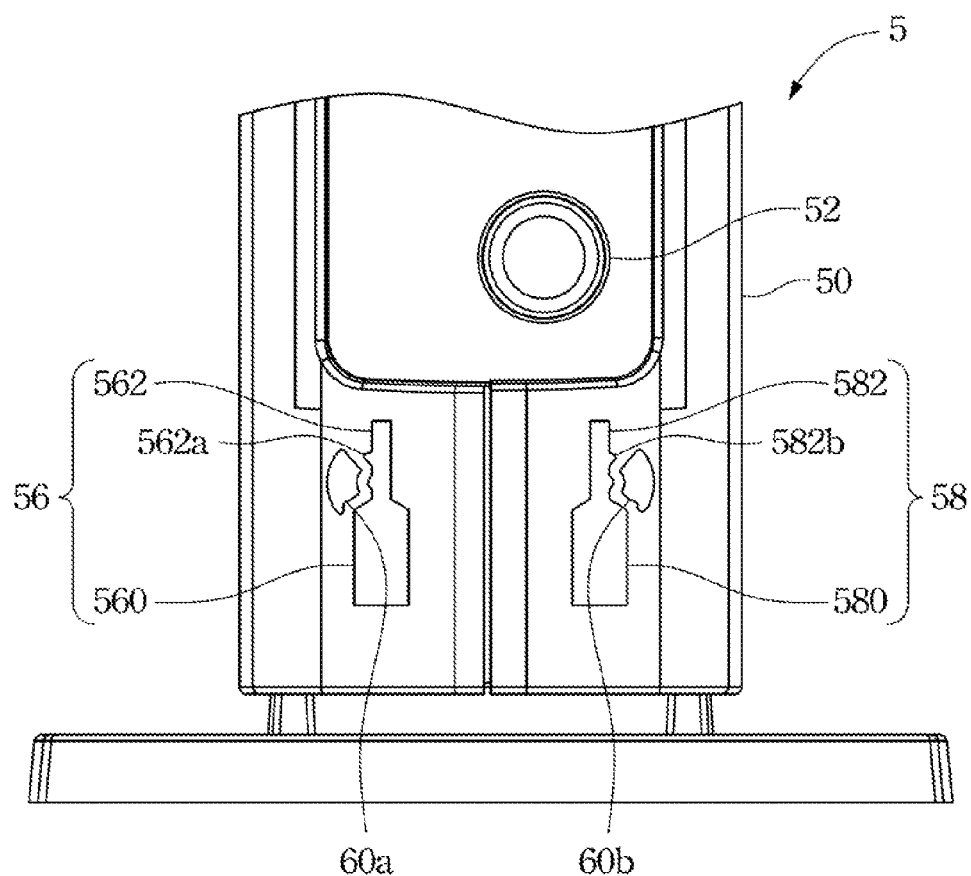
FIG. 5A is a front view showing the housing of the electronic apparatus according to another embodiment of the invention.
Figure 5B:
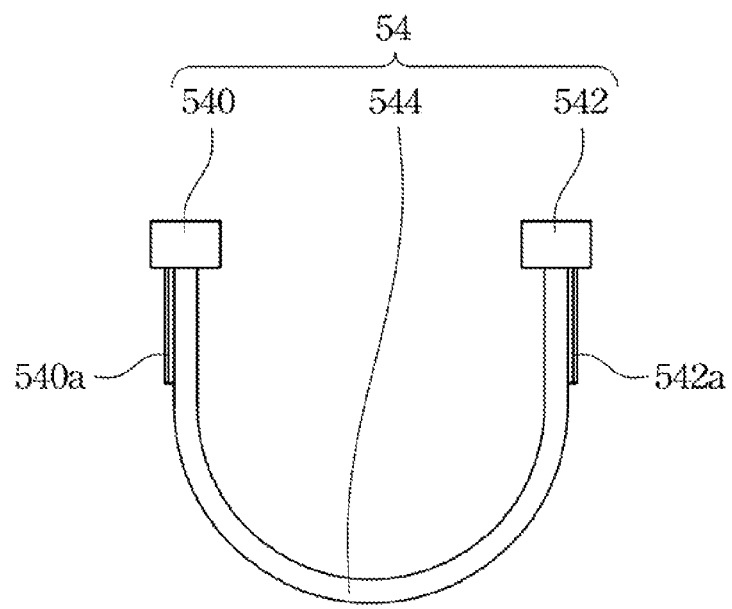
FIG. 5B is a top view showing the retaining member of the electronic apparatus according to another embodiment.

Please refer to FIG. 5A and FIG. 5B. FIG. 5A is a front view showing the housing 50 of the electronic apparatus 5 according to another embodiment of the invention. FIG. 5B is a top view showing the retaining member 54 of the electronic apparatus 5 according to another embodiment.

As shown in FIG. 5A and FIG. 5B, the electronic apparatus 5 of the embodiment mainly includes a housing 50 and a retaining member 54. The housing 50 of the electronic apparatus 5 includes a connecting hole 52, a first engagement hole 56, and a second engagement hole 38. The first engagement hole 56 of the housing 50 includes a first passing zone 560 and a first engagement zone 562 that are communicated to each other. The second engagement hole 58 of the housing 50 includes a second passing zone 580 and a second engagement zone 582 that are communicated to each other. Besides, the retaining member 54 of the electronic apparatus 5 includes a first engagement end 540, a second engagement end 542, and a retaining portion 544. The retaining portion 544 of the retaining member 54 is connected between the first engagement end 540 and second engagement end 542.

Figure 6A:
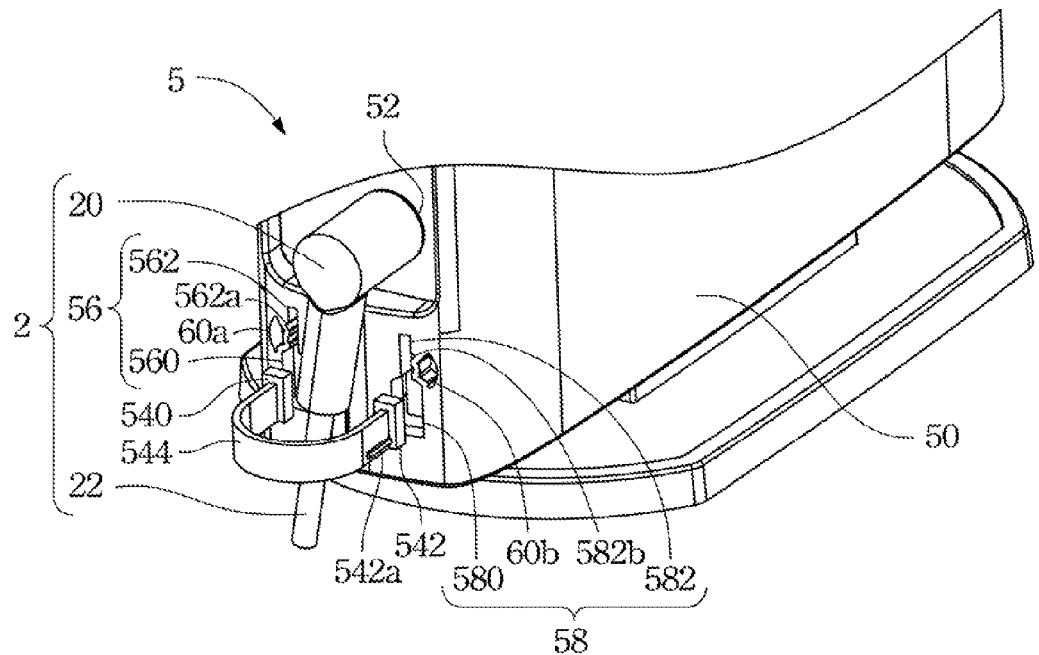
FIG. 6A is a stereoscopic view showing the electronic apparatus in FIG. 5A, wherein the retaining member has not been engaged to the first engagement hole and the second engagement hole.
Figure 6B:
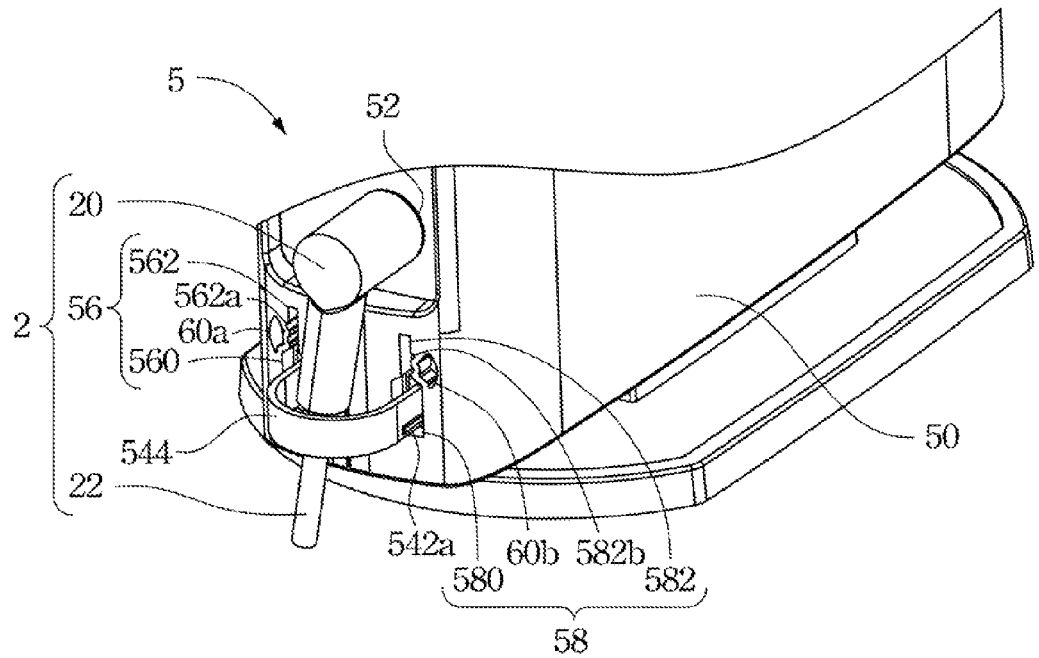
FIG. 6B is another stereoscopic view showing the electronic apparatus in FIG. 5A, wherein the first engagement end and the second engagement end have passed into the housing respectively through the first passing zone and the second passing zone.
Figure 6C:
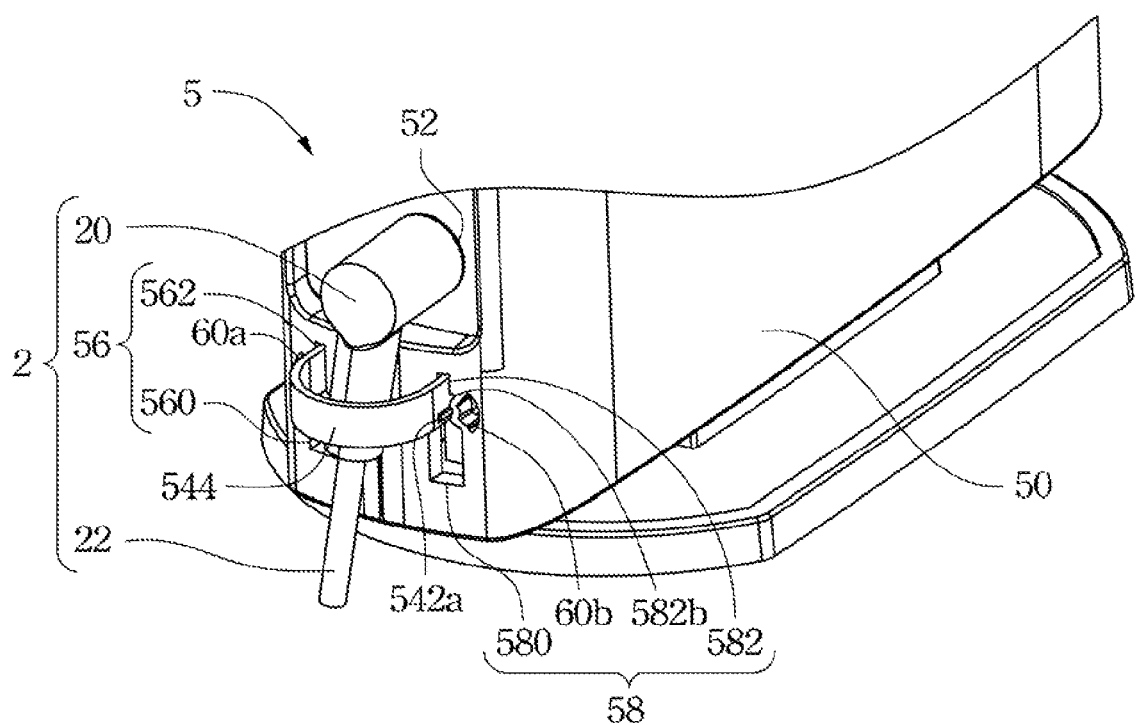
FIG. 6C is another stereoscopic view showing the electronic apparatus in FIG. 5A, wherein the first engagement end and the second engagement end have been respectively engaged to the first engagement zone and the second engagement zone.

Please refer to FIG. 6A, FIG. 6B, and FIG. 6C. FIG. 6A is a stereoscopic view showing the electronic apparatus 5 in FIG. 5A, wherein the retaining member 54 has not been engaged to the first engagement hole 56 and the second engagement hole 58. FIG. 6B is another stereoscopic view showing the electronic apparatus 5 in FIG. 5A, wherein the first engagement end 540 and the second engagement end 542 have passed into the housing 50 respectively through the first passing zone 560 and the second passing zone 580. FIG. 6C is another stereoscopic view showing the electronic apparatus 5 in FIG. 5A, wherein the first engagement end 540 and the second engagement end 542 have been respectively engaged to the first engagement zone 562 and the second engagement zone 582.

As shown in FIG. 6A, FIG. 6B, and FIG. 6C, the connector 2 can be detachably connected to the connecting hole 52 on the housing 50 of the electronic apparatus 5. Under the circumstances that the connector 2 and the connecting hole 52 of the housing 50 are connected to each other, the first engagement end 540 is capable of passing into the housing 50 through the first passing zone 560 of the first engagement hole 56 and adapted to be engaged with the first engagement zone 562 of the first engagement hole 56 to be fixed to the housing 50, and the second engagement end 542 is capable of passing into the housing 50 through the second passing zone 580 of the second engagement hole 58 and adapted to be engaged with the second engagement zone 582 of the engagement hole 58 to be fixed to the housing 50. Accordingly, the retaining portion 544 that is connected between the first engagement end 540 and the second engagement end 542 of the retaining member 54 can trap the connector 2, so as to limit the movement of the connector 2 relative to the electronic apparatus 5 and increase the stability between the connector 2 and the electronic apparatus 5. Furthermore, the connector 2 is constrained between the housing 50 and the retaining portion 544 of the retaining member 54 after the retaining member 54 is completely assemble on the housing 50.

In the embodiment, the width of the first engagement zone 562 of the first engagement hole 56 is smaller than that of the first passing zone 560, and the width of the second engagement zone 582 of the second engagement hole 58 is smaller than that of the second passing zone 580. That is to say, the first engagement hole 56 including the first passing zone 560 and the first engagement zone 562 that are communicated to each other and the second engagement hole 58 including the second passing zone 580 and the second engagement zone 582 that are communicated to each other can, but not limited to, be T-shaped.

As shown in FIG. 6A, FIG. 6B, and FIG. 6C, the first engagement end 540 of the retaining member 54 can further include a first bump 540a, and the second first engagement end 542 of the retaining member 54 can further include a second bump 542a. The first engagement zone 562 of the first engagement hole 56 can further include at least one first recess 562a, and the second engagement zone 582 of the second engagement hole 58 can further include at least one second recess 582b. The first recess 562a of the first engagement zone 562 is adapted to be engaged with the first bump 540a of the first engagement end 540, and the second recess 582b of the second engagement zone 582 is adapted to be engaged with the second bump 542a of the second engagement end 542, so as to achieve the goal of fixing the first engagement end 540 and the second engagement end 542 of the retaining member 54 to the housing 50. In an embodiment, the first bump 540a of the first engagement end 540 can be replaced by the first recess 562a of the first engagement zone 562, and the second bump 542a of the second engagement end 542 can be replaced by the second recess 582b of the second engagement zone 582. Correspondingly, the first recess 562a of the first engagement zone 562 can be replaced by the first bump 540a of the first engagement end 540, and the second recess 582b of the second engagement zone 582 can be replaced by the second bump 542a of the second engagement end 542, so as to achieve the goal of fixing the first engagement end 540 and the second engagement end 542 of the retaining member 54 to the housing 50. In the embodiment, the first engagement zone 562 and the second engagement zone 582 respectively include, but not limited to, two first recesses 562a and two second recesses 582b (as shown in FIG. 5A). The quantities of the first recesses 562a of the first engagement zone 562 and the second recesses 582b of the second engagement zone 582 can be elastically adjusted according to the requirements during designing or the limitations during manufacturing.

Furthermore, in order to make retaining member 54 to be conveniently fixed to the housing 50, the first bump 540a of the first engagement end 540 can further extend to the retaining portion 544, and the second bump 542a of the second engagement end 542 can further extend to the retaining portion 544. By lengthening the first bump 540a of the first engagement end 540 and the second bump 542a of the second engagement end 542, the first bump 540a of the first engagement end 540 can be conveniently engaged with the first recess 562a of the first engagement zone 562, and the second bump 542a of the second engagement end 542 can be conveniently engaged with the second recess 582b of the second engagement zone 582. In the embodiment, the first bump 540a of the first engagement end 540, the second bump 542a of the second engagement end 542, the first recess 562a of the first engagement zone 562, and the second recess 582b of the second engagement zone 582 can also be, but not limited to, strip-shaped. The shapes of the first bump 540a of the first engagement end 540, the second bump 542a of the second engagement end 542, the first recess 562a of the first engagement zone 562, and the second recess 582b of the second engagement zone 582 can be elastically adjusted according to the requirements during designing or the limitations during manufacturing.

As shown in FIG. 6A, FIG. 6B, and FIG. 6C, the retaining member 54 of the electronic apparatus 5 can be made of materials having ductility. In the embodiment, the retaining member 54 can be made of bendable metal materials. Because metal materials are difficultly be deformed, the housing 50 of the embodiment can further include a first through hole 60a and a second through hole 60b. The first through hole 60a and the second through hole 60b of the housing 50 are respectively adjacent to the first engagement zone 562 of the first engagement hole 56 and the second engagement zone 582 of the second engagement hole 58, so as to respectively allow the first engagement zone 562 and the second engagement zone 582 to deform when the first engagement zone 562 and the second engagement zone 582 are compressed. In other words, during the process that the first engagement end 540 is pushed from the first passing zone 560 of the first engagement hole 56 toward the first engagement zone 562 and the second engagement end 542 is pushed from the second passing zone 580 of the second engagement hole 58 toward the second engagement zone 582, the first bump 540a of the first engagement end 540 and the second bump 542a of the second engagement end 542 will respectively compress the first engagement zone 562 and the second engagement zone 582 to respectively deform toward the first through hole 60a and the second through hole 60b. When the first bump 540a of the first engagement end 540 and the second bump 542a of the second engagement end 542 respectively move to the first recess 562a of the first engagement zone 562 and the second recess 582b of the second engagement zone 582, the first engagement zone 562 and the second engagement zone 582 will elastically recover to respectively make the first recess 562a and the first bump 540a of the first engagement end 540 to be engaged to each other and make the second recess 582b and the second bump 542a of the second engagement end 542 to be engaged to each other.

In an embodiment, the retaining member 54 can also be made of polymeric materials (e.g. rubber) that are bendable and compressible. Accordingly, during the process that the first engagement end 540 is pushed from the first passing zone 560 of the first engagement hole 56 toward the first engagement zone 562 and the second engagement end 542 is pushed from the second passing zone 580 of the second engagement hole 58 toward the second engagement zone 582, the first bump 540a of the first engagement end 540 and the second bump 542a of the second engagement end 542 will be respectively compressed and deformed by the first engagement zone 562 and the second engagement zone 582. When the first bump 540a of the first engagement end 540 and the second bump 542a of the second engagement end 542 respectively move to the first recess 562a of the first engagement zone 562 and the second recess 582b of the second engagement zone 582, the first bump 540a of the first engagement end 540 and the second bump 542a of the second engagement end 542 will elastically recover to be respectively engaged to with the first recess 562a and the second recess 582b. In other words, if the retaining member 54 is made of elastic materials capable of being compressed, the first through hole 60a and the second through hole 60b of the housing 50 can be omitted.

As shown in FIG. 6A, FIG. 6B, and FIG. 6C, the connector 2 includes a terminal 20 and a cable 22. The terminal 20 of the connector 2 can be detachably connected to the connecting hole 52 of the housing 50. In the embodiment, the retaining portion 544 of the retaining member 54 mainly traps, but not limited to, the cable 22 of the connector 2. In other words, the retaining portion 544 of the retaining member 54 can also trap or hook the terminal 20 of the connector 2, so as to limit the movement of the connector 2 relative to the electronic apparatus 5 and increase the stability between the connector 2 and the electronic apparatus 5.

Besides, in order to prevent the terminal 20 of the connector 2 from easily separating from the connecting hole 52 when the cable 22 of the connector 2 is pulled, the length of the retaining portion 544 of the retaining member 54 can be properly adjusted. For example, in order to achieve the effect of anti-off, the length of the retaining portion 544 can be, but not limited to, smaller than two times of the length of the terminal 20 of the connector 2. In other words, in order to achieve better effect of anti-off, the length of the retaining portion 544 can be much smaller than two times of the length of the terminal 20 of the connector 2.

According to the foregoing recitations of the embodiments of the invention, it is obvious that the electronic apparatus of the invention mainly includes following advantages. By adding a retaining member for trapping the external connector on the electronic apparatus, the external connector can be prevented from, falling off from the electronic apparatus to influent the functions of the electronic apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electronic apparatus being adapted for a connector, the electronic apparatus comprising:
    a housing comprising:
        a connecting hole being detachably connected by the connector; and
        an engagement hole comprising a passing zone and an engagement zone that are communicated to each other;
    a retaining member comprising:
        a fixing end being fixed to the housing;
        an engagement end being capable of passing into the housing through the passing zone and adapted to be engaged with the engagement zone, wherein the direction along which the engagement end passes through the passing zone is different from the direction along which the engagement end is engaged with the engagement zone; and
        a retaining portion being connected between the fixing end and the engagement end for trapping the connector; and
    a through hole, adjacent to the engagement zone, for allowing the engagement zone to deform when the engagement zone is compressed.

2. The electronic apparatus of claim 1, wherein the engagement end comprises a bump, the engagement zone comprises a recess, and the recess is adapted to be engaged with the bump.

3. The electronic apparatus of claim 1, wherein the width of the engagement zone is smaller than that of the passing zone.

4. The electronic apparatus of claim 1, wherein the connector is constrained between the housing and the retaining portion.

5. An electronic apparatus being adapted for a connector, the electronic apparatus comprising:
    a housing comprising:
        a connecting hole being detachably connected by the connector; and
        an engagement hole comprising a passing zone and an engagement zone that are communicated to each other;
    a retaining member comprising:
        a first engagement end;
        a second engagement end being detachably engaged with the first engagement end, wherein the first engagement end and the second engagement end that are engaged to each other are capable of passing into the housing through the passing zone and adapted to be engaged with the engagement zone, and the direction along which the first engagement end and the second engagement end pass through the passing zone is different from the direction along which the first engagement end and the second engagement end are engaged with the engagement zone; and
        a retaining portion being connected between the first engagement end and the second engagement end for trapping the connector; and
    a first through hole and a second through hole, respectively adjacent to two sides of the engagement zone. for allowing the engagement zone to deform when the engagement zone is compressed.

6. The electronic apparatus of claim 5, wherein the first engagement end comprises a first bump, the second engagement end comprises a second bump, the engagement zone comprises a first recess and a second recess, the first recess is adapted to be engaged with the first bump, and the second recess is adapted to be engaged with the second bump.

7. The electronic apparatus of claim 5, wherein the width of the engagement zone is smaller than that of the passing zone.

8. The electronic apparatus of claim 5, wherein the connector is constrained among the first engagement end, the second engagement end, and the retaining portion.

9. An electronic apparatus being adapted for a connector, the electronic apparatus comprising:
   a housing, comprising:
     a connecting hole being detachably connected by the connector;
     a first engagement hole comprising a first passing zone and a first engagement zone that are communicated to each other; and
     a second engagement hole comprising a second passing zone and a second engagement zone that are communicated to each other;
   a retaining member comprising:
     a first engagement end being capable of passing into the housing through the first passing zone and adapted to be engaged with the first engagement zone, wherein the direction along which the first engagement end passes through the first passing zone is different from the direction along which the first engagement end is engaged with the first engagement zone;
     a second engagement end being capable of passing into the housing through the second passing zone and adapted to be engaged with the second engagement zone, wherein the direction along which the second engagement end passes through the second passing zone is different from the direction along which the second engagement end is engaged with the second engagement zone; and
     a retaining portion being connected between the first engagement end and the second engagement end for trapping the connector;
   a first through hole, adjacent to the first engagement zone, for allowing the first engagement zone to deform when the first engagement zone is compressed; and
   a second through hole, adjacent to the second engagement zone, for allowing the second engagement zone to deform when the second engagement zone is compressed.

10. The electronic apparatus of claim 9, wherein the first engagement end comprises a first bump, the second engagement end comprises a second bump, the first engagement zone comprises a first recess, the first recess is adapted to be engaged with the first bump, the second engagement zone comprises a second recess, and the second recess is adapted to be engaged with the second bump.

11. The electronic apparatus of claim 9, wherein the width of the first engagement zone is smaller than that of the first passing zone, and the width of the second engagement zone is smaller than that of the second passing zone.

12. The electronic apparatus of claim 9, wherein the connector is constrained between the housing and the retaining portion.

* * * * *